Figure 1:
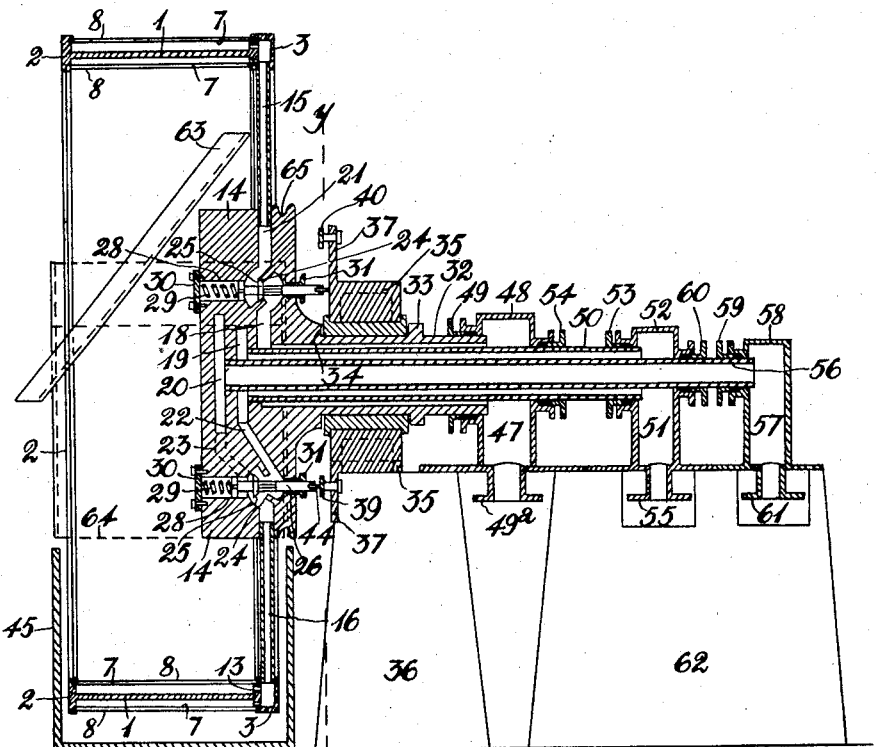

A. J. ARBUCKLE.
ROTARY FILTERING APPARATUS.
APPLICATION FILED OCT. 19, 1908.

994,235.

Patented June 6, 1911.

2 SHEETS—SHEET 1.

Witnesses:
Chas. Ovendale
H. Ovendale

Inventor:
Alexander John Arbuckle

Witnesses
Chas. Ovendale
F. Ovendale

Inventor:
Alexander John Arbuckle

UNITED STATES PATENT OFFICE.

ALEXANDER JOHN ARBUCKLE, OF JOHANNESBURG, TRANSVAAL, ASSIGNOR OF ONE-HALF TO THE ANGLO FRENCH EXPLORATION COMPANY, LIMITED, OF LONDON, ENGLAND.

ROTARY FILTERING APPARATUS.

994,235. Specification of Letters Patent. Patented June 6, 1911.

Application filed October 19, 1908. Serial No. 458,541.

*To all whom it may concern:*

Be it known that I, ALEXANDER JOHN ARBUCKLE, a subject of the King of Great Britain, and resident of Johannesburg, Transvaal, have invented certain new and useful Improvements in Rotary Filtering Apparatus, of which the following is a specification.

This invention has reference to rotary filtering apparatus applicable for separating pulverized ore from liquid or the solid and liquid components of other fluid masses.

It has been more particularly designed for separating slimes (the minute particles of crushed ore products) from cyanid or other solvent solution, wash water or other liquid, although it may also be utilized for separating sands (the coarser particles of crushed ore products) from such liquids, or for separating mixtures of sands and slimes from any of such liquids.

The invention has reference to that type of rotary filter in which the liquid is drawn by suction through the filter, and the separated solids, which are thereby caused to adhere to the surfaces of the filter, are detached or removed by a fluid under pressure caused to pass through the filter in the reverse direction to that of the filtering flow.

The object of the invention is to simplify and improve filters of the type referred to and to construct a machine of large capacity and one in which any necessary repairs may be effected more expeditiously than at present.

In accordance with my invention I employ a rotatable cylindrical filter frame. This frame comprises a hollow cylindrical portion flanged at its ends and constructed with external and internal ribs between the flanges. Interiorly and exteriorly of the cylinder between the flanges and over the ribs is secured filtering material. The compartments formed exteriorly and interiorly of the cylinder communicate with chambers formed in one of the flanges of the cylinder. This cylindrical frame is carried at one end by means of a plurality of radial tubular members which at their outer ends are attached to the hollow flange of the frame and communicate with the chambers formed therein and at their inner ends are secured to a hub portion and communicate with spaces formed therein. In the passages in the hub between the tubular members and the aforementioned spaces are constructed valve seats. The hub is constructed to accommodate valves which are adapted to be automatically actuated to open and close the passages as will be hereinafter more particularly described. The spaces formed in the hub communicate with independent openings at one side of the hub.

The machine may be designed to work with a primary or filtering suction, a secondary draining or drying suction (hereinafter referred to as the vacuum) and a back pressure. In this case three non-communicating spaces are provided in the hub, one communicating with that set, or those, of the tubular members utilized for the primary suction and filtering flow, one communicating with that set, or those, of the tubular members utilized for the vacuum, and the other communicating with that set, or those, of the tubular members utilized for the back pressure. The non-communicating spaces will then communicate through independent openings one with a suitable suction-creating apparatus, another with a suitable vacuum-creating apparatus, and the other with means for forcing fluid under pressure through the filter in the reverse direction to that of the filtering and draining flow.

The machine may be designed to work with suction and back pressure only. In this case the non-communicating spaces will be formed in the hub, one communicating with those tubular members utilized for the suction and filtering flow, and the other communicating with those serving for the back pressure. The non-communicating spaces will then be connected the one with a suitable suction-creating apparatus, and the other with means for forcing fluid under pressure through the filter in the reverse direction to that of the suction and filtering flow.

In the accompanying drawing I illustrate a practical embodiment of my invention in which the machine is designed to work with suction, vacuum and back pressure, and I will proceed to a more detailed description of the same by aid of the drawing, in which—

Figures 4, 5, 6, 7, 8:
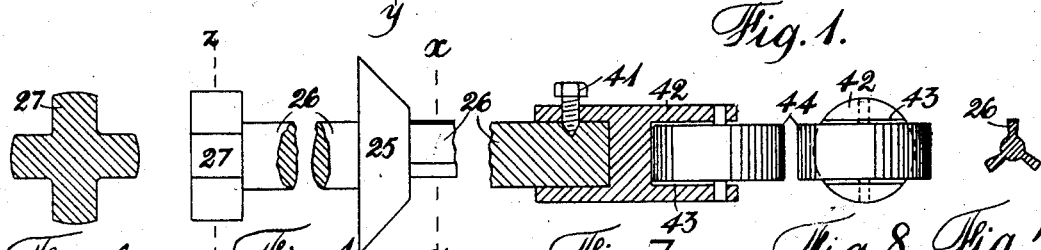
Figure 9:
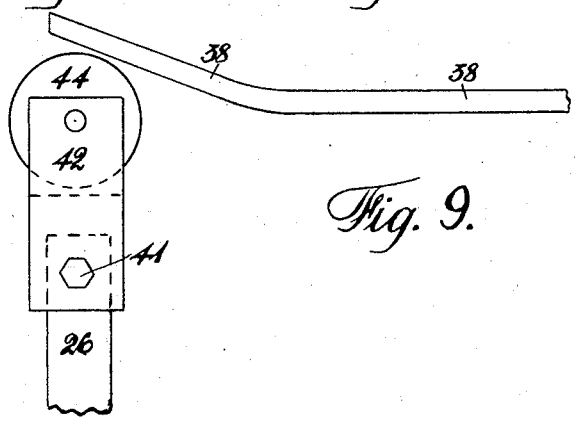
Figures 2, 3:
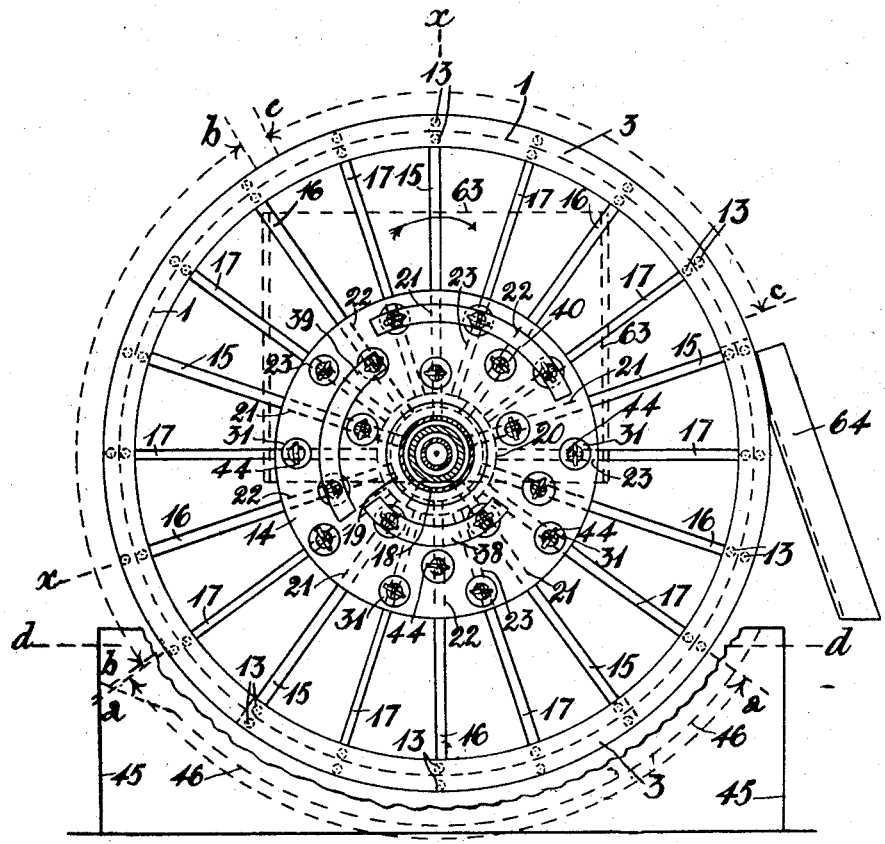

Figure 1 is a longitudinal sectional elevation of the machine the plane of section being indicated by the line x—x in Fig. 2. Fig. 2 is a transverse sectional elevation of Fig. 1 on the line y—y. Fig. 3 is an enlarged detail of the filtering frame. Fig. 4 is an enlarged detail of one of the valves. Fig. 5 is a transverse section of Fig. 4 on the line x—y. Fig. 6 is a transverse section of Fig. 4 on the line z—z. Fig. 7 is an enlarged detail of the valve spindle and its connections. Fig. 8 is an end elevation of Fig. 7, and Fig. 9 is an enlarged detail of a portion of one of the stationary cam plates and one of the valve spindle connections.

In Figs. 1, 2 and 3, 1 designates the hollow cylindrical portion of the rotary filtering frame. It is constructed at the one end with an external and internal flange 2 and at the other end with a hollow flange 3 and between the flanges with transverse ribs or webs 4 which divide the annular spaces between the flanges 2, 3, into a plurality of circumferential non-communicating compartments. The hollow flange 3 is also divided into a corresponding number of compartments by means of partitions 5 in line with the ribs or webs 4. The flanges 2, 3, are recessed on the inside as indicated at 6 to form ledges for securing the filtering material around the inner and outer circumferences of the frame. The filtering medium may as shown in Fig. 3, consist of wire screening or perforated suitably curved metal plates 7 fitting within the recesses 6 and filter-cloth, canvas or other suitable textile material 8 of a suitable texture, secured in position by means of a preferably segmental ring 9 fixed in the recesses 6 by means of set-screws or their equivalent 10. The filtering material will preferably be employed in sections and be secured in a similar manner along the outer edges of the ribs or webs 4. The interior of the hollow flange 3 is placed in communication with the circumferential compartments, interiorly and exteriorly of the cylinder by apertures 13.

The filtering frame is carried and rotated by means of the hub portion 14. The frame is connected to the hub portion 14 by three sets of tubular members or pipes 15, 16, 17; one set 15 being utilized for the suction, another 16 for the vacuum and the other set 17 for the back pressure. As will be seen on reference to Fig. 2 one suction member 15, one vacuum member 16 and two back pressure members 17 are provided for each of the five circumferential compartments of the filter frame. The several pipes 15, 16, 17 communicate with their respective compartments through the interior of the hollow flange 3 as will be readily understood on reference to Figs. 1 and 3 and for each pipe two of the apertures 13 are formed on the inside of the hollow flange.

In the hub 14 are formed three non-communicating spaces 18, 19, 20, the one 18 for the suction, another 19 for the vacuum, and the third 20 for the back pressure. From each of these spaces radiate passages 21, 22, 23 corresponding to the number and position of the suction, vacuum, and back pressure pipes 15, 16, 17 so that all the suction pipes 15 communicate through their passages 21 with the suction space 18; all the vacuum pipes 16 through their passages 22 with the vacuum space 19, and all the back pressure pipes 17 through their passages 23 with the back pressure space 20. In each of the passages 21, 22, 23, is constructed a valve seat 24 and the passage is enlarged to accommodate a valve 25 which is adapted to close the passage, see Fig. 1. Each valve spindle 26 is constructed with a grooved piston or head 27 which is adapted to work in a cylindrical recess 28 communicating with the valve chamber. In the recess 28 at the back of the piston 27 is arranged a spiral spring 29 which serves for keeping the valve 25 on its seat to close the passage. This spring 29 is retained in position by means of a plate 30 fixed to the outside of the hub 14. A portion of the valve spindle 26 on the opposite side of the valve 25 is grooved or fluted—see Figs. 4 and 5—so as not to unduly impede the flow through the passage when the valve is open. An extension of this portion of the valve spindle 26 works through a gland 31 fitted in the other side of the hub 14.

On that side of the hub 14 remote from the filter frame, is formed a hollow trunnion or shaft 32. This shaft 32 is formed with an annular projection 33 and with a shoulder 34, and that part of the shaft between said projection and shoulder runs in a bearing 35 supported on a suitable foundation 36. The bearing 35 on the side next the hub 14 is constructed with a flange 37. To this flange 37 are bolted, riveted or otherwise suitably fixed three curved cam plates 38, 39, 40. Arranged as shown more particularly in Fig. 2 they actuate the three sets of valves. The outer cam 40, as shown, serves for operating the back pressure valves, the intermediate cam 39 the vacuum valves, and the inner cam 38 the suction valves. To the outer end of each valve spindle 26 is fixed—see more particularly Figs. 7 and 8,—by means of a set-screw 41 a socket member 42 formed on the one side to receive the end of the spindle 26 and bifurcated at the outer end. In the bifurcation 43 is rotatably carried a roller 44 which is adapted, as the filter frame is rotated, to contact with its cam. To insure proper operation of the valves the cam plates are preferably curved outwardly at their extremities as shown in Fig. 9. With the cams arranged as shown, the suction valves are opened during that portion of the revolution of the frame indicated by the curved dotted line a—a in Fig. 2, the vacuum valves during that portion of the revolution of the frame indicated by the curved dotted line $b$—$b$, and the back pressure valves during that portion of the revolution of the frame indicated by the dotted line $c$—$c$. The filter frame in its lower portion rotates in a vessel 45 which is preferably curved at the bottom as indicated by the dotted line 46, and the mixture of solids and liquid to be separated is maintained at or about the level of the dotted line $d$—$d$ in Fig. 2.

The bore of the trunnion 32 at its inner end communicates with the suction space 18 and at its outer end with a chamber 47 formed in a casting or piece 48. The casting is on the one side provided with a gland 49 surrounding the trunnion. It is also constructed with a flanged branch 49$^a$ for connecting thereto in any convenient manner the suction-creating apparatus. Concentrically arranged inside the bore of the hollow trunnion 32 is a pipe 50 whose external diameter is less than the internal diameter of the bore. This pipe 50 at its inner end communicates with the vacuum space 19 in the hub 14 and at its other end communicates with a chamber 51 formed in a casting or piece 52, which is provided on the one side with a gland 53 surrounding the pipe 50. The other casting 48 is also provided with a gland 54 surrounding the pipe 50. This casting 52 is constructed with a flanged branch 55 for connecting thereto the vacuum-creating apparatus. Arranged concentrically within the pipe 50 is another pipe 56 whose external diameter is less than the internal diameter of the pipe 50. This pipe 56 communicates with the back pressure space 20 in the hub 14 at the one end and opens into a chamber 57 formed in another casting 58 at the other end. This casting 58 is fitted with a gland 59 surrounding the pipe 56 and the casting 52 is also fitted with a gland 60 surrounding said pipe. The casting 58 is constructed with a flanged branch 61 for connecting thereto the back pressure creating apparatus. The several castings 48, 52, 58 are carried at the necessary height by the foundations 36, 62.

Inside the filter frame is arranged a chute or inclined plane 63 for receiving the solid matter detached from the surface of the filtering material interiorly of the frame when the back pressure is applied, and 64 is another chute or inclined plane for receiving the matter detached from the surface of the filtering material exteriorly of the frame. These chutes 63, 64 may be arranged to deliver the solids into or on to any suitable means for conveyance to any desired point.

In the construction of the modified form of the invention, when suction and back pressure only are employed, then one of the concentric pipes 50 or 56 and its connections are dispensed with. The tubular members 16 employed for the vacuum may also be dispensed with, or they may all connect with either the suction or back pressure spaces 18, 20 in the hub 14, or some with the suction and some with the back pressure, as preferred.

The hub 14 on the side next the bearing 35 is shown formed with a peripheral groove 65 for rotating the filter frame by means of a rope drive. Alternately it may be driven by means of a belt, toothed wheels or in any other convenient manner.

In the operation of the machine as previously explained the fluid mass is conducted into the vessel 45 and maintained at or about the level of the dotted line $d$—$d$ in Fig. 2. The filter is rotated at a suitable rate of speed and the suction, vacuum, and back pressure creating apparatus are all set in motion. As the filter frame rotates the valve of each tubular member 15 connected with the suction space 18 is opened when the outer end of said tubular member 15 is below the level $d$—$d$, being automatically closed just before said tubular member rises above said level. The suction pipe or pipes 15 of one or more of the compartments, are always immersed so that a continuous withdrawal of the liquid from the vessel 45 is effected. The liquid passing through the tubular members 15 past the valves to the suction space 18 is withdrawn through the bore of the trunnion 32 and chamber 47. The vacuum valves are in like manner automatically opened which results in a partial vacuum being set up in the vacuum space 19, passages 22, vacuum pipes 16 and filtering compartments which draws any moisture remaining in the solids adhering to the surface of the filtering material through the interstices of said material, and also any liquid in the compartment, pipes 16 and passages 22 leading to the vacuum space. Any liquid so extracted and removed is withdrawn through the pipe 50 and chamber 51. The back pressure valves are also actuated after the vacuum valves are closed to apply the back pressure to release the solids adhering to the surfaces of the filtering material.

What I claim as my invention and desire to protect by Letters Patent is:—

1. In filtering apparatus of the nature specified, in combination, a cylindrical frame having continuous interior and exterior circumferential filtering surfaces and divided into a plurality of circumferential non-communicating compartments and independent suction and back pressure connections for each compartment as set forth.

2. In filtering apparatus of the nature specified, in combination, a cylindrical frame having continuous interior and exterior circumferential filtering surfaces and divided between said surfaces into a plurality of circumferential non-communicating compartments, filtering suction, independent draining suction, and back pressure connections for each compartment, as set forth.

3. In filtering apparatus of the nature specified, in combination, a cylindrical frame having continuous interior and exterior circumferential filtering surfaces and divided between said surfaces into a plurality of circumferential non-communicating compartments, independent suction and back pressure connections for each compartment and means for placing said connections in communication with their respective compartments during pre-determined portions of the revolution of the frame, as set forth.

4. In filtering apparatus of the nature specified, in combination, a cylindrical frame having continuous interior and exterior circumferential filtering surfaces and divided between said surfaces into a plurality of circumferential non-communicating compartments, filtering suction, independent draining suction, and back pressure connections for each compartment and means for placing said connections in communication with their respective compartments during pre-determined portions of the revolution of the frame, as set forth.

5. In filtering apparatus of the nature specified, in combination, a filter frame comprising a cylindrical member flanged exteriorly and interiorly at the one end and having a hollow exterior and interior flange at the other end, said hollow flange being divided into a plurality of non-communicating circumferential compartments, the cylindrical member having interior and exterior ribs or webs between the flanges forming said member interiorly and exteriorly into a plurality of non-communicating circumferential compartments corresponding to the compartments of the hollow flange, the hollow flange on the inside having passages placing the compartments in the hollow flange in communication with the corresponding compartments interiorly and exteriorly of the cylindrical member and filtering material secured between the flanges interiorly and exteriorly of the cylinder as set forth.

6. In filtering apparatus of the nature specified, in combination, a filter frame comprising a cylindrical member flanged externally and internally at one end and having a hollow external and internal flange at the other end, said flange being divided into a plurality of non-communicating compartments the cylinder having exterior and interior ribs between the flanges, the interior and exterior flanges at both ends being recessed to receive the filtering material, filtering material secured between the flanges interiorly and exteriorly of the cylinder and rings for securing said filtering material in said recesses.

7. In filtering apparatus of the nature specified, in combination, a filter frame comprising a cylinder flanged externally and internally at the one end and having a hollow external and itnernal flange at the other end, said flange being divided into a plurality of non-communicating circumferential compartments, the cylinder having exterior and interior ribs between the flanges forming external and internal compartments corresponding to the compartments in the hollow flange, the hollow flange having passages placing the compartments in the hollow flange in communication with the external and internal compartments of the cylinder, filtering material secured exteriorly and interiorly of the cylinder between the flanges, filtering suction, independent draining suction, and back pressure pipes for each compartment in the hollow flange as set forth.

8. In filtering apparatus of the nature specified, in combination, a cylindrical frame having continuous interior and exterior circumferential filtering surfaces and divided into a plurality of non-communicating circumferential compartments, independent suction and back pressure pipes for each compartment, a hub portion having separate non-communicating spaces for the suction and back pressure connections and a passage from the suction space for each suction pipe and independent passages from the back pressure space to the back pressure pipes as set forth.

9. In filtering apparatus of the nature specified, in combination, a cylindrical frame having continuous interior and exterior circumferential filtering surfaces and divided into a plurality of non-communicating circumferential compartments, independent suction and back pressure pipes for each compartment, a hub portion having separate non-communicating spaces for the suction and back pressure connections and a passage from the suction space for each suction pipe and independent passages from the back pressure space to the back pressure pipes, a valve in each suction and back pressure passage and means for actuating said valves to open them during pre-determined portions of the revolution of the frame as set forth.

10. In filtering apparatus of the nature specified, in combination, a cylindrical frame having continuous interior and exterior circumferential filtering surfaces and divided into a plurality of non-communicating compartments, filtering suction, independent draining suction, and back pressure pipes for each compartment, a hub portion having separate non-communicating spaces for the filtering suction, independent draining suction, and the back pressure connections, and a passage from the filtering suction space for each filtering suction pipe, and a passage from the draining suction space for each draining suction pipe, and a passage from the back pressure space for each back pressure pipe as set forth.

11. In filtering apparatus of the nature specified, in combination, a cylindrical frame having continuous interior and exterior circumferential filtering surfaces and divided into a plurality of non-communicating compartments, filtering suction, independent draining suction, and back pressure pipes for each compartment, a hub portion having separate non-communicating spaces for the filtering suction, independent draining suction, and the back pressure connections, and a passage from the filtering suction space for each filtering suction pipe, and a passage from the draining suction space for each draining suction pipe, and a passage from the back pressure space for each back pressure pipe, a valve in each filtering suction, independent draining suction, and back pressure passage and means for actuating said valves to open them during pre-determined portions of the revolution of the frame as set forth.

12. In filtering apparatus of the nature specified, in combination, a cylindrical frame having continuous interior and exterior circumferential filtering surfaces and divided into a plurality of non-communicating compartments, independent suction and back pressure pipes for each compartment, a hub portion having separate non-communicating spaces for the suction and back pressure connections, said spaces opening to one and the same side of the hub portion, said hub portion also having a passage from the suction space for each suction pipe, and a passage from the back pressure space for each back pressure pipe, the hub portion having a hollow trunnion communicating with one space and a pipe concentrically arranged inside the hollow trunnion and communicating with the other space, separate suction, and back pressure chambers, said hollow trunnion and concentric pipe communicating the one with the suction chamber and the other with the back pressure chamber as set forth.

13. In filtering apparatus of the nature specified, in combination, a cylindrical frame having continuous interior and exterior circumferential filtering surfaces and divided into a plurality of non-communicating compartments, filtering suction, independent draining suction, and back pressure pipes for each compartment and a hub portion having separate non-communicating spaces for the filtering suction, independent draining suction, and the back pressure connections, said spaces opening to one and the same side of the hub portion, said hub portion also having a passage from the filtering suction space for each filtering suction pipe, a passage from the draining suction space for each draining suction pipe, and a passage from the back pressure space for each back pressure pipe, separate filtering suction, draining suction, and back pressure chambers, the hub portion having a hollow trunnion communicating with one space and two pipes concentrically arranged inside the hollow trunnion and communicating independently with the two other spaces, the hollow trunnion and the two concentric pipes communicating with the separate filtering suction, draining suction, and back pressure chambers as set forth.

14. In filtering apparatus of the nature specified, in combination, a cylindrical frame having continuous internal and external circumferential filtering surfaces and divided between said surfaces into a plurality of non-communicating compartments, separate suction and back pressure pipes for each compartment, a hub portion having separate non-communicating spaces for the suction and back pressure connections, a passage from the suction space for each suction pipe and a passage from the back pressure space for each back pressure pipe, a valve in each suction and back pressure passage, means for actuating each of said valves during pre-determined portions of the revolution of the filter frame, the hub portion having a hollow trunnion in communication with one space and a pipe concentrically arranged inside the hollow trunnion communicating with the other space, separate suction and back pressure chambers, said hollow trunnion and concentric pipe communicating the one with the suction chamber and the other with the back pressure chamber, as set forth.

15. In filtering apparatus of the nature specified, in combination, a cylindrical frame having continuous internal and external circumferential filtering surfaces and divided between said surfaces into a plurality of non-communicating compartments, filtering suction, independent draining suction, and back pressure pipes for each compartment, a hub portion having separate non-communicating spaces for the filtering suction, independent draining suction, and the back pressure connections, a passage from the filtering suction space for each filtering suction pipe, a passage from the draining suction space for each draining suction pipe, and a passage from the back pressure space for each back pressure pipe, a valve in each filtering suction, independent draining suction, and back pressure passage, means for actuating each of said valves during pre-determined portions of the revolution of the filter frame, the hub portion having a hollow trunnion communicating with one space and two pipes concentrically arranged inside the hollow trunnion and communicating independently with the other two spaces, filtering suction, independent draining suction, and back pressure chambers, the hollow trunnion and the two concentric pipes communicating independently with the filtering suction, independent draining suction, and back pressure chambers as set forth.

16. In filtering apparatus of the nature specified, in combination, a cylindrical frame having continuous interior and exterior circumferential filtering surfaces and divided between said surfaces into a plurality of non-communicating compartments, filtering suction, independent draining suction, and back pressure pipes for each compartment, a hub portion having separate non-communicating spaces for the filtering suction, draining suction, and back pressure connections, a passage from the filtering suction space for each filtering suction pipe, a passage from the draining suction space for each draining suction pipe, and a passage from the back pressure space for each back pressure pipe, a valve in each filtering suction, draining suction, and back pressure passage, means for actuating each of said valves during pre-determined portions of the revolution of the filter frame, said means comprising curved stationary cam plates, rollers revolubly attached to the outer ends of the valve spindles and springs which are placed in compression when the valves are opened and serve for closing the valves when the rollers disengage the cam plates, as set forth.

17. In filtering apparatus of the nature specified, in combination, a cylindrical frame having continuous interior and exterior circumferential filtering surfaces and divided between said surfaces into a plurality of non-communicating compartments, filtering suction, independent draining suction, and back pressure pipes for each compartment, a hub portion having separate non-communicating spaces for the filtering suction, independent draining suction, and the back pressure connections, a passage from the filtering suction space for each filtering suction pipe, a passage from the draining suction space for each draining suction pipe, and a passage from the back pressure space for each back pressure pipe, a valve in each filtering suction, draining suction, and back pressure passage, means for actuating each of said valves during pre-determined portions of the revolution of the filter frame, said means comprising curved stationary cam plates, rollers revolubly attached to the outer ends of the valve spindles and springs which are placed in compression when the valves are opened and serve for closing the valves when the rollers disengage the cam plates, the hub portion having a hollow trunnion communicating with one space and two pipes concentrically arranged inside the hollow trunnion and communicating independently with the other two spaces, separate filtering suction, draining suction, and back pressure chambers, the hollow trunnion and the two concentric pipes communicating independently with the separate filtering suction, draining suction, and back pressure chambers, chutes for receiving the separated solids detached from the interior and exterior filtering surfaces, driving means for the filter frame and a vessel for holding the mixture to be separated and arranged so that a portion of the filter frame runs therein as it is rotated, as set forth.

18. In filtering apparatus of the nature specified, in combination, a cylindrical frame having continuous interior and exterior circumferential filtering surfaces and divided between said surfaces into a plurality of non-communicating compartments, filtering suction, independent draining suction, and back pressure pipes for each compartment, a hub portion having separate non-communicating spaces for the filtering suction, independent draining suction and back pressure connections, a passage from the filtering suction space for each filtering suction pipe, a passage from the draining suction space for each draining suction pipe, and a passage from the back pressure space for each back pressure pipe, a valve in each filtering suction, independent draining suction, and back pressure passage, means for actuating all the valves from one side of the hub, said means comprising stationary cam plates adapted to open their respective sets of valves during pre-determined portions of the revolution of the filter frame and rollers revolubly attached to the outer ends of the valve spindles and springs located in holes in the hub and engaging the inner ends of the valve spindles, as set forth.

In testimony whereof I have signed my name to this specification in the presence of two subscribing witnesses.

ALEXANDER JOHN ARBUCKLE.

Witnesses:
CHAS. OVENDALE,
F. A. OVENDALE.